(12) United States Patent
Smetana et al.

(10) Patent No.: US 12,029,351 B2
(45) Date of Patent: Jul. 9, 2024

(54) CAPACTIVE TOUCH UNIVERSAL HOLDING BIN

(71) Applicant: Marmon Foodservice Technologies, Inc., Osseo, MN (US)

(72) Inventors: Brian Smetana, Downers Grove, IL (US); Donald Sweeney, St. Charles, IL (US); Ebrahim Kassamali, Osseo, MN (US); Sean Forrest, Park Ridge, IL (US); Rich Bauer, Palatine, IL (US); Nagasuryarama Vegesna, Osseo, MN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 572 days.

(21) Appl. No.: 17/219,326

(22) Filed: Mar. 31, 2021

(65) Prior Publication Data
US 2021/0307563 A1    Oct. 7, 2021

Related U.S. Application Data

(60) Provisional application No. 63/004,965, filed on Apr. 3, 2020.

(51) Int. Cl.
*A47J 39/00* (2006.01)
*A47F 10/06* (2006.01)

(52) U.S. Cl.
CPC .............. *A47J 39/006* (2013.01); *A47F 10/06* (2013.01)

(58) Field of Classification Search
CPC .... A47J 39/006; A47J 537/0641; A47J 27/00; A47J 27/08; A47J 27/09; A47J 27/092;
(Continued)

(56) References Cited

U.S. PATENT DOCUMENTS

D63,818 S    1/1924  Curtiss
2,386,919 A  10/1945 Tobey
(Continued)

FOREIGN PATENT DOCUMENTS

EP   008195325-0001    10/2020
EP   008195325-0002    10/2020
(Continued)

OTHER PUBLICATIONS

"Modular Holding Cabinets", Product Catalog, Carter-Hoffmann, Mundelein, Illinois (Jan. 2014).
(Continued)

*Primary Examiner* — Phuong T Nguyen
(74) *Attorney, Agent, or Firm* — Andrus Intellectual Property Law, LLP

(57) ABSTRACT

A holding bin includes a plurality of compartments defined across a width of the holding bin, each compartment of the plurality of compartments configured to receive a plurality of food holding trays. A housing defines an outer perimeter of the holding bin. A first display is secured through the housing. A second display is removably secured to the housing. A controller is communicatively connected to the first display and the second display. The controller is configured to operate the first display and the second display to coordinately present a location and a status of a food tray within a compartment of the plurality of compartments.

19 Claims, 10 Drawing Sheets

(58) Field of Classification Search
CPC .......... A47J 36/025; A47J 36/06; A47J 36/08;
A47J 36/10; A47J 36/12; A47J 36/165;
A47J 36/18; A47J 36/20; A47J 36/22;
A47J 37/00; A47J 37/12; A47J 537/1204;
A47J 37/1209; A47J 37/1214; A47J
37/1219; A47J 37/1266; A47J 37/129;
A47J 37/1295; A47F 10/06
USPC ......... 99/324, 325, 330–343, 369, 400, 418,
99/422, 425, 426, 430, 440, 444, 447,
99/448, 449, 451, 483, 495, 501
See application file for complete search history.

(56) References Cited

U.S. PATENT DOCUMENTS

| | | |
|---|---|---|
| 2,900,806 A | 8/1959 | Wurtz et al. |
| 2,934,913 A | 5/1960 | Haines et al. |
| 3,042,384 A | 7/1962 | Bauman |
| 3,275,393 A | 9/1966 | Stentz et al. |
| 3,301,618 A | 1/1967 | Feldser et al. |
| 3,308,633 A | 3/1967 | Kritzer, Jr. |
| 3,393,630 A | 7/1968 | Pickens |
| 3,414,709 A | 12/1968 | Tricault |
| 3,696,720 A | 10/1972 | Vinson |
| 3,950,632 A | 4/1976 | Rivelli |
| 3,979,056 A | 9/1976 | Barnes |
| D243,362 S | 2/1977 | Shumrak et al. |
| 4,036,995 A | 7/1977 | Koether et al. |
| 4,077,690 A | 3/1978 | Koether |
| 4,093,041 A | 6/1978 | Davis et al. |
| 4,278,872 A | 7/1981 | Koether et al. |
| 4,306,616 A | 12/1981 | Woods, Jr. et al. |
| 4,355,521 A | 10/1982 | Tsai |
| 4,388,689 A | 6/1983 | Hayman et al. |
| 4,530,067 A | 7/1985 | Dorr |
| 4,569,421 A | 2/1986 | Sandstedt |
| 4,610,238 A | 9/1986 | Veth |
| 4,633,230 A | 12/1986 | Tam |
| 4,644,931 A | 2/1987 | Veth |
| 4,688,475 A | 8/1987 | Witt et al. |
| 4,740,888 A | 4/1988 | Ceste, Sr. et al. |
| 4,742,455 A | 5/1988 | Schreyer |
| 4,782,445 A | 11/1988 | Pasquini |
| 4,812,625 A | 3/1989 | Ceste, Sr. |
| 4,812,963 A | 3/1989 | Albrecht et al. |
| 4,864,498 A | 9/1989 | Pasquini et al. |
| 4,911,068 A | 3/1990 | Koether et al. |
| 4,922,435 A | 5/1990 | Cahlander et al. |
| 5,003,472 A | 3/1991 | Perrill et al. |
| 5,069,273 A | 12/1991 | O'Hearne |
| 5,093,556 A | 3/1992 | Oelfke |
| 5,128,862 A | 7/1992 | Mueller |
| 5,132,914 A | 7/1992 | Cahlander et al. |
| 5,172,328 A | 12/1992 | Cahlander et al. |
| 5,188,020 A | 2/1993 | Buchnag |
| 5,216,918 A | 6/1993 | Landis et al. |
| 5,218,527 A | 6/1993 | Ishikawa et al. |
| 5,247,807 A | 9/1993 | Jarman et al. |
| 5,253,564 A | 10/1993 | Rosenbrock et al. |
| D341,054 S | 11/1993 | Maputol |
| 5,357,426 A | 10/1994 | Morita et al. |
| D364,530 S | 11/1995 | Robards, Jr. et al. |
| 5,485,780 A | 1/1996 | Koether et al. |
| D369,269 S | 4/1996 | Labadia Del Fresno |
| 5,504,589 A | 4/1996 | Montague et al. |
| 5,510,979 A | 4/1996 | Moderi et al. |
| 5,539,671 A | 7/1996 | Albrecht et al. |
| 5,553,312 A | 9/1996 | Gattey et al. |
| 5,579,952 A | 12/1996 | Fiedler et al. |
| 5,590,586 A | 1/1997 | Ulfig et al. |
| 5,594,222 A | 1/1997 | Caldwell |
| 5,616,269 A | 4/1997 | Fowler et al. |
| 5,653,906 A | 8/1997 | Fowler et al. |
| 5,724,886 A | 3/1998 | Ewald et al. |
| 5,772,072 A | 6/1998 | Prescott et al. |
| 5,783,803 A | 7/1998 | Robards, Jr. |
| 5,812,393 A | 9/1998 | Drucker |
| 5,900,173 A | 5/1999 | Robards, Jr. |
| 5,921,096 A | 7/1999 | Warren |
| 5,931,083 A | 8/1999 | Stanger et al. |
| 5,939,974 A | 8/1999 | Heagle et al. |
| 5,944,324 A | 8/1999 | Schultheis et al. |
| 5,947,012 A | 9/1999 | Ewald et al. |
| 6,000,622 A | 12/1999 | Tonner et al. |
| 6,006,996 A | 12/1999 | Bhatnagar |
| 6,011,243 A | 1/2000 | Arnold et al. |
| 6,026,372 A | 2/2000 | Savage |
| 6,031,208 A | 2/2000 | Witt et al. |
| 6,052,667 A | 4/2000 | Walker et al. |
| D427,008 S | 6/2000 | Wasner |
| D427,479 S | 7/2000 | Wasner |
| 6,088,681 A | 7/2000 | Coleman et al. |
| 6,114,659 A | 9/2000 | Finck et al. |
| 6,116,154 A | 9/2000 | Vaseloff |
| 6,119,587 A | 9/2000 | Ewald et al. |
| D434,265 S | 11/2000 | Tatlow |
| 6,153,244 A | 11/2000 | Stanger et al. |
| 6,158,885 A | 12/2000 | Landis |
| 6,175,099 B1 | 1/2001 | Shei et al. |
| 6,200,944 B1 | 3/2001 | Dovey et al. |
| 6,209,447 B1 | 4/2001 | Ewald et al. |
| 6,257,010 B1 | 7/2001 | Shei et al. |
| 6,261,621 B1 | 7/2001 | Stanger et al. |
| 6,262,394 B1 | 7/2001 | Shei et al. |
| 6,412,403 B1 | 7/2002 | Veltrop |
| 6,434,961 B2 | 8/2002 | Richmond et al. |
| 6,502,411 B2 | 1/2003 | Okamoto |
| 6,539,842 B1* | 4/2003 | Chapman .............. A47J 37/049 |
| | | 374/E1.004 |
| 6,541,739 B2 | 4/2003 | Shei et al. |
| D480,260 S | 10/2003 | Domi et al. |
| 6,637,322 B2 | 10/2003 | Veltrop |
| 6,658,994 B1 | 12/2003 | McMillan |
| 6,825,447 B2 | 11/2004 | Kim et al. |
| 6,834,276 B1 | 12/2004 | Jensen et al. |
| 6,878,391 B2 | 4/2005 | Veltrop |
| 6,884,451 B2 | 4/2005 | Veltrop |
| 7,028,498 B2 | 4/2006 | Monroe et al. |
| 7,105,779 B2 | 9/2006 | Shei |
| 7,132,926 B2 | 11/2006 | Vaseloff et al. |
| 7,227,102 B2 | 6/2007 | Shei |
| 7,232,062 B1 | 6/2007 | Salerno |
| 7,235,762 B2 | 6/2007 | Gagas et al. |
| 7,238,654 B2 | 7/2007 | Hodge et al. |
| 7,258,064 B2 | 8/2007 | Vaseloff et al. |
| 7,279,659 B2 | 10/2007 | Gagas et al. |
| 7,328,654 B2 | 2/2008 | Shei |
| RE40,151 E | 3/2008 | Shei et al. |
| RE40,290 E | 5/2008 | Shei et al. |
| 7,376,485 B2 | 5/2008 | Salerno |
| D570,715 S | 6/2008 | Di Federico |
| 7,381,927 B1 | 6/2008 | Agnello |
| 7,385,160 B2 | 6/2008 | Jones |
| 7,446,282 B2 | 11/2008 | Shei et al. |
| 7,628,107 B2 | 12/2009 | Vaseloff et al. |
| 7,762,636 B2 | 7/2010 | Veeser et al. |
| 7,858,906 B2 | 12/2010 | Veltrop et al. |
| 7,905,173 B2 | 3/2011 | Sus et al. |
| 7,971,523 B2 | 7/2011 | Hartfelder et al. |
| 8,091,472 B2 | 1/2012 | Maciejewski et al. |
| 8,096,231 B2 | 1/2012 | Veltrop et al. |
| 8,134,101 B2 | 3/2012 | Majchrzak |
| 8,247,745 B2 | 8/2012 | Chung et al. |
| 8,404,292 B2 | 3/2013 | Veltrop et al. |
| 8,522,675 B2 | 9/2013 | Veltrop |
| 8,558,142 B2 | 10/2013 | Theodos et al. |
| 8,607,587 B2 | 12/2013 | Veltrop |
| 8,667,807 B2 | 3/2014 | Veltrop |
| D704,982 S | 5/2014 | Gates |
| D716,095 S | 10/2014 | Veltrop et al. |
| D725,429 S | 3/2015 | Veltrop et al. |
| 8,997,636 B2 | 4/2015 | Kirby et al. |
| 9,003,820 B2 | 4/2015 | Veltrop |

(56) References Cited

U.S. PATENT DOCUMENTS

| | | |
|---|---|---|
| 9,068,768 B2 | 6/2015 | Veltrop |
| 9,140,484 B2 | 9/2015 | Veltrop |
| 9,140,485 B2 | 9/2015 | Veltrop |
| 9,854,943 B2 | 1/2018 | Betzold et al. |
| D809,326 S | 2/2018 | Kestner et al. |
| 9,976,750 B1 | 5/2018 | Kestner et al. |
| 9,980,322 B1 | 5/2018 | Kestner et al. |
| D872,573 S | 1/2020 | Kestner et al. |
| 2001/0007322 A1 | 7/2001 | Shei et al. |
| 2001/0053963 A1 | 12/2001 | Kim et al. |
| 2003/0118706 A1 | 6/2003 | Veltrop |
| 2004/0000162 A1 | 1/2004 | Song |
| 2004/0016242 A1 | 1/2004 | Song et al. |
| 2004/0019534 A1 | 1/2004 | Callahan et al. |
| 2004/0020915 A1 | 2/2004 | Shei |
| 2004/0060320 A1 | 4/2004 | Roh et al. |
| 2005/0211696 A1 | 9/2005 | Adamski |
| 2005/0236947 A1 | 10/2005 | LeClear et al. |
| 2006/0150662 A1 | 7/2006 | Lee et al. |
| 2006/0185527 A1 | 8/2006 | Shei |
| 2007/0017245 A1 | 1/2007 | Song et al. |
| 2007/0144202 A1 | 6/2007 | Theodos et al. |
| 2007/0251397 A1 | 11/2007 | Dorsten et al. |
| 2007/0251667 A1 * | 11/2007 | Ewald .............. A47J 39/006 165/918 |
| 2008/0023462 A1 | 1/2008 | Shei et al. |
| 2008/0213449 A1 | 9/2008 | Wisner et al. |
| 2008/0302778 A1 | 12/2008 | Veltrop et al. |
| 2009/0045185 A1 | 2/2009 | Schroeder et al. |
| 2009/0126580 A1 | 5/2009 | Hartfelder et al. |
| 2009/0199723 A1 | 8/2009 | Veltrop et al. |
| 2009/0199725 A1 | 8/2009 | Veltrop et al. |
| 2009/0266244 A1 | 10/2009 | Maciejewski et al. |
| 2009/0309027 A1 | 12/2009 | Von Striver |
| 2010/0205992 A1 | 8/2010 | Morris |
| 2011/0030565 A1 | 2/2011 | Shei |
| 2011/0083564 A1 * | 4/2011 | Kirby .............. A47J 39/006 99/468 |
| 2011/0114618 A1 | 5/2011 | Chung et al. |
| 2011/0252813 A1 | 10/2011 | Veltrop |
| 2011/0252984 A1 | 10/2011 | Chung |
| 2011/0253698 A1 | 10/2011 | Theodos et al. |
| 2011/0253703 A1 | 10/2011 | Theodos et al. |
| 2011/0278278 A1 | 11/2011 | Emerich et al. |
| 2011/0283895 A1 | 11/2011 | Veltrop |
| 2012/0079699 A1 | 4/2012 | Veltrop et al. |
| 2012/0261426 A1 | 10/2012 | Tomczyk et al. |
| 2012/0285942 A1 | 11/2012 | Godecker et al. |
| 2013/0175253 A1 | 7/2013 | Shei et al. |
| 2014/0010937 A1 | 1/2014 | Stanger |
| 2014/0057031 A1 | 2/2014 | Ewald et al. |
| 2014/0083309 A1 | 3/2014 | Reese et al. |
| 2014/0130684 A1 | 5/2014 | Reese et al. |
| 2014/0150461 A1 | 6/2014 | Veltrop |
| 2014/0165644 A1 | 6/2014 | Veltrop |
| 2014/0174101 A1 | 6/2014 | Veltrop |
| 2014/0197177 A1 | 7/2014 | Veltrop et al. |
| 2014/0246966 A1 | 9/2014 | Nevarez |
| 2014/0263269 A1 | 9/2014 | Veltrop et al. |
| 2015/0023126 A1 | 1/2015 | Brown |
| 2015/0201749 A1 | 7/2015 | Turner et al. |
| 2015/0201803 A1 | 7/2015 | Veltrop |
| 2017/0290466 A1 | 10/2017 | Lundberg et al. |
| 2018/0103803 A1 | 4/2018 | Laub et al. |

FOREIGN PATENT DOCUMENTS

| | | |
|---|---|---|
| EP | 008195325-0003 | 10/2020 |
| JP | 8000414 | 1/1996 |
| JP | 10079088 | 3/1998 |
| JP | 11342061 | 12/1999 |
| WO | WO 2001/31533 | 5/2001 |
| WO | WO 2005/034633 | 4/2005 |

OTHER PUBLICATIONS

Frymaster HCP Installation and Operation Manual, Dec. 2006, pp. 1-1 to 10-4, title page and table of publisher, Enodis, Frymaster LLC, Shreveport, LA.

Prince Castle LLC, Holding Bins (www.princecastle.com <http://www.princecastle.com>).

Prince Castle LLC, Holding Panels (www.princecastle.com <http://www.princecastle.com>).

Thermodyne Food Products, Inc., Counter Top Holding Oven Model 300 NDNL specification.

Prince Castle LLC, Holding Bin DHB3PT-33DD, Jun. 2015.

Prince Castle LLC, Original Instructions Operation Manual for Holding Bin DHB3PT-33DD, DHB3SS-33D, available prior to Apr. 19, 2016.

Extended European Search Report for European Application No. 21167000.5, dated Jul. 30, 2021.

Examination Report for European Application No. 21167000.5, dated Feb. 8, 2024.

* cited by examiner

CAPACTIVE TOUCH UNIVERSAL HOLDING BIN

CROSS-REFERENCE TO RELATED APPLICATIONS

The present application claims priority to U.S. Provisional Patent Application No. 63/004,965, filed on Apr. 3, 2020, and which is incorporated by reference herein in its entirety.

BACKGROUND

U.S. Pat. No. 7,232,062 entitled "Method and Apparatus for Monitoring the Status and Transfer of Food Products" is incorporated by reference herein in its entirety and discloses a system and method for monitoring a status of a plurality of products, such as prepared food, located in product locations within stations throughout a restaurant. The status of each product indicates whether that product exists in a particular storage location and whether that product has exceeded its shelf life or hold time. The storage time which has elapsed for each product is automatically counted and compared to the hold time. A cook time, which is the duration of time required to cook a particular product, is also maintained for each of the products. The status indicates when additional product should be cooked in order to have new product prior to the expiration of existing product by indicating when the hold time less the cook time has elapsed. The status also indicates when additional product should be cooked in order to have new product prior to the expiration of existing product by indicating when the hold time less the cook time has elapsed. The status also indicates which product is the oldest to facilitate the transfer and use of the oldest product first. A transfer of one product to another product location automatically transfers the corresponding elapsed storage time with that product.

U.S. Pat. No. 9,976,750 entitled "Multi-zone Food Holding Bin" is incorporated by reference herein in its entirety and discloses a multi-zone food holding bin with a continuous food supporting surface with multiple food holding zones. Each food holding zone is independently controllable so that different food temperatures may be maintained in adjacent food holding zones.

US Patent Application Publication No. 2017/0290466, entitled "Touchless Timer and Product Management for Food Holding Devices" is incorporated by reference herein in its entirety and discloses a hot food holding cabinet to detect the presence and uniquely identify a plurality of food holding trays within a plurality of food holding locations within a hot food holding cabinet. There can also be multiple, separate food holding cabinets that are linked together. Timing and other functions related to the storage of the food holding trays are initiated automatically, without any manual input from a user. This allows for the automated initiation and tracking of product quality parameters by the cabinet computer. The parameters can include product timers and holding profiles, and whether the food holding trays are removed, transferred between bins in a single cabinet, or transferred between separate cabinets.

US Patent Application Publication No. 2018/0103803, entitled "Modular Holding Bin with Tunable System Behavior" is incorporated by reference herein in its entirety and discloses a modular food holding bin with multiple food holding units or bins. The food holding units can be connected and disconnected from each other in multiple different configurations. Each bin can be set to its own temperature, independently of the others. The modular holding bin may be programmed using tunable parameters that may be set remotely.

BRIEF DISCLOSURE

An example of a holding bin includes a plurality of compartments defined across a width of the holding bin, each compartment of the plurality of compartments configured to receive a plurality of food holding trays. A housing defines an outer perimeter of the holding bin. A first display is secured through the housing. A second display is removably secured to the housing. A controller is communicatively connected to the first display and the second display. The controller is configured to operate the first display and the second display to coordinately present a location and a status of a food tray within a compartment of the plurality of compartments.

In examples of the holding bin, the first display is mounted to the housing at a position above the plurality of compartments. The second display may be mounted adjacent to the plurality of compartments. The second display may include a plurality of active regions, each active region of the plurality of active regions adjacent to and associated with one compartment of the plurality of compartments. Each active region may include a plurality of icons, and each icon of the plurality is associated with a tray location within the associated compartment. The holding bin may include two secondary displays. The holding bin may include two first displays. The active regions may be configured to receive at least one user input, wherein at least one user input received at an active region is communicated to the controller. The first display may be configured to receive at least one user input and the active regions of the sidebar display configured to receive at least one user input.

In further examples of the holding bin, the holding bin may include a shelf located between two vertically adjacent compartments of the plurality of compartments, wherein the shelf comprises a bottom panel of an upper compartment of the plurality of compartments and the shelf comprises a top panel of a lower compartment of the plurality of compartments. The holding bin may further include an end cap secured to a face of the shelf, the end cap comprising a leading surface. The leading surface may angle upwards to the bottom panel. The shelf may be inset within the housing and the end cap secured to the face of the shelf is inset within the housing. The shelf may be an uppermost shelf and the upper compartment is the uppermost compartment of the plurality of compartments, and the top end cap is secured to the housing across the compartment and a leading surface of the top end cap angles downwardly to a top panel of the uppermost compartment of the plurality of compartments. The compartments of the plurality of compartments may be vertically dimensioned to be within 0.25 inch of a vertical height dimension of the food tray. The second display may be secured to a sidebar housing, the sidebar housing movably secured to the housing. The sidebar housing may be pivotably secured to the housing. The sidebar housing may further include an alignment projection that secures the sidebar housing to the housing with an interference fit. The sidebar housing may define a sidebar cavity in which an electrical connection between the controller and the second display is made.

In additional examples of the holding bin, the first display and the second display each present the location and the status of a food tray within a compartment of the plurality of compartments. The controller may be physically communicatively connected to the first display and the controller is wirelessly communicatively connected to the second display. The second display may include a magnet and the second display is removably secured to the housing by the magnet.

DETAILED DISCLOSURE

Food warming units, which are also known as food holding ovens or food holding bins, are used in the food industry to keep pre-cooked foods in a condition for consumption until they are delivered to a customer. Such holding bins allow pre-cooked food items to be stored separately until needed. By way of example, when a fast-food restaurant receives an order for a sandwich, the sandwich is typically assembled on a food preparation table where the sandwich components are brought together to assemble the customer's order. Certain sandwich components, a hamburger patty for example, can be removed from a food holding bin in proximity to the preparation table, where the hamburger patty is held until sandwich assembly. Storing pre-cooked foods in food warming units thus enables quick sandwich assembly and efficient order fulfillment.

Figure 1:
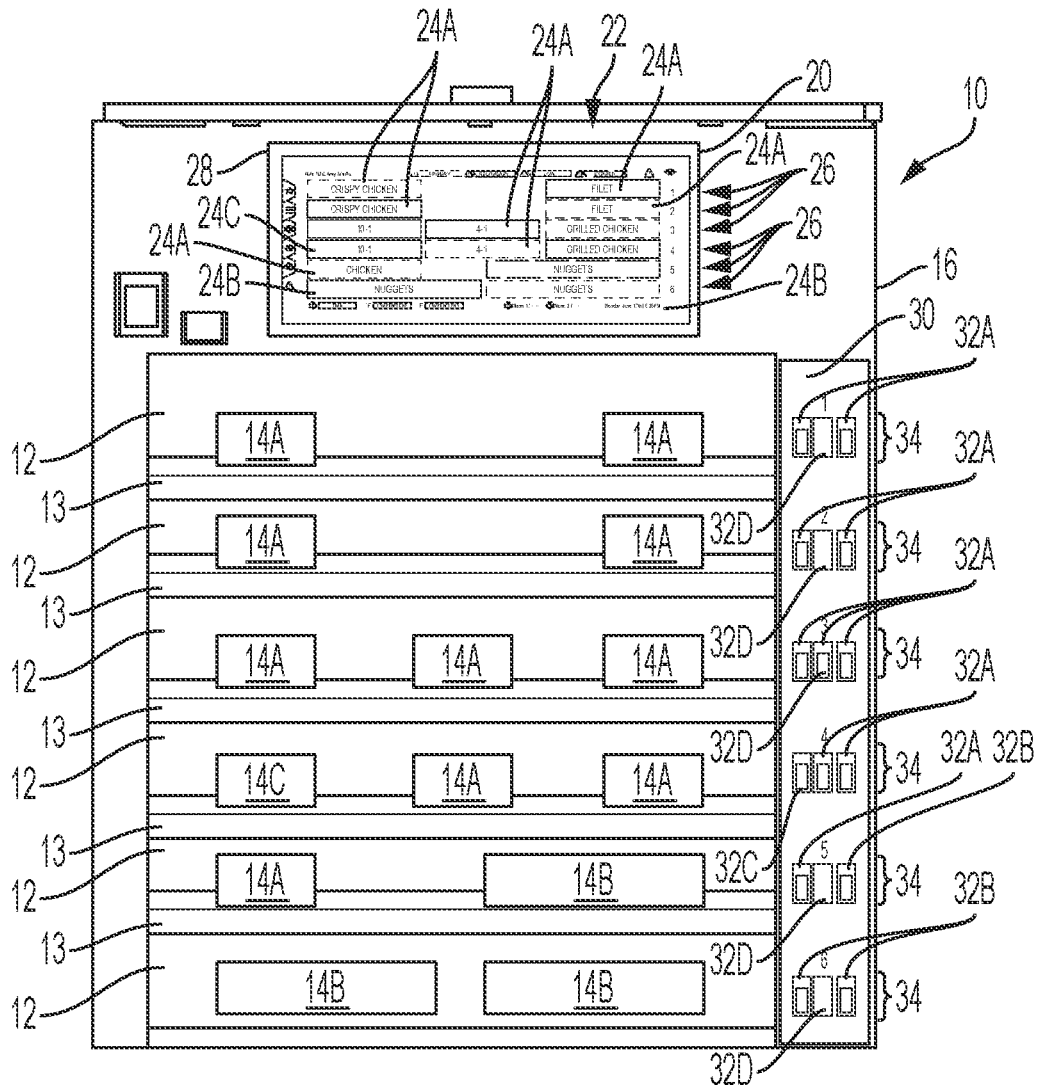
FIG. 1 depicts a holding bin.

FIG. 1 depicts a holding bin 10 which includes a plurality of compartments 12. The holding bin 10 may be configured with the compartments 12 in a vertical stack, as depicted in FIG. 1. The number of compartments in the stack may be any number, but may often be between two and six. However, it will be recognized that in other examples, the compartments 12 may be arranged horizontally, or in a combination of horizontal and vertical, for example, a 2×2 grid. The compartments 12 are each defined by a top panel, side panels, and a bottom panel. The bottom panel is configured to receive a tray thereon as described in further detail herein.

Each compartment is configured to receive one or more trays 14 therein. The trays 14 are configured to hold a cooked food product therein. While trays may have relatively standardized dimensions, trays in multiples of these dimensions may result in arrangements in which varying numbers of trays, for example, one, two, three, or four trays may simultaneously fit within a compartment.

The holding bin 10 operates as disclosed herein to direct thermal energy into the compartments 12. Heating elements (not depicted) within the holding bin 10 and positioned relative to respective top and/or bottom panels and produce the thermal energy which is directed into the compartment 12. The heating elements may be resistive wires, IR diodes, quartz, ceramic, or heat lamps, although other forms of heating elements will be recognized from the present disclosure. In examples, multiple separately controllable heating elements are arranged across the top panel and/or the bottom panel of each compartment. This enables a single compartment to be controlled to create multiple controlled environments within the single compartment to hold different types of food within the compartment to different holding specifications. These specifications may include a set temperature, a temperature profile that changes over time, and/or a relative humidity. When a holding bin 10 includes multiple compartments 12, the holding bin typically includes shelves 13 disposed between vertically adjacent compartments 12. The shelves 13 contain the heating elements and thus represent both a bottom panel to one compartment 12 and a top panel to a compartment 12 located adjacently below.

The holding bin 10 includes a product tracking system that enables a user to track the identification and contents of each of the trays of food held within the compartments of the holding bin 10. In addition to providing an identification of the type of food held within each location of the holding bin 10, the product tracking system operates to identify a length of time that the food has been held and/or a remaining time that the food can be held before it must be thrown away and replaced. The product tracking system may also provide an indication of the remaining food product in the tray at each location. In examples, the remaining food product may be an amount of food product that has not already been allocated to assembly of a customer order, even if the food item has not yet been used for the order assembly. The identification of the food item to be held at each location may be correlated to other parameters of the product tracking system and/or operation of the holding bin. For example, particular food items may have certain temperature, humidity, and/or timing requirements specified for holding such food items. These food item definitions may be programmed into the holding bin through the user interface as described herein or may be communicatively provided to the holding bin through a wired or wireless communicative connection and stored in memory of the holding bin. Additionally, the holding bin may have different operational configurations or dayparts with predefined food items and operational settings depending upon the time of day or meal currently served by the restaurant (e.g. breakfast menu, lunch menu, supper menu).

The inventors have discovered that the flexibility in the operation and resulting use of holding bins as described above is not supported in currently available user interfaces. Therefore, the inventors have sought to provide new user interface solutions for holding bins that accommodate the variety of potential uses and operations of the holding bins described above.

As shown in FIG. 1, the holding bin 10 is provided with a primary display 20. The primary display 20 is exemplarily positioned at the center top of the holding bin 10 at the front face of the holding bin 10. In exemplary embodiments, the primary display is a touch-sensitive display that thus also operates as a user input device. The primary display 20, as described in further detail herein, operates to present a graphical user interface (GUI) 22 which provides an indication of the above-mentioned features of a product tracking system as well as the information described herein. The primary display 20 presents an identification of a food item for which each location in the food holding bin 10 is configured to hold. The primary display 20 additionally provides an indication of the remaining amount of food product left in the tray at that location and/or a remaining time until that food must be discarded, and/or an elapsed time since the food in the tray at that location was cooked. The primary display 20 may further operate to graphically represent each location within the compartments 12 of the holding bin 10. While depicted in FIG. 1, this is presented in a more detailed view in FIG. 3. In examples, the primary display 20 is rectangular in shape and may be seven inches corner-to-corner, while in other examples the primary display 20 may be twelve inches corner-to-corner. Other sizes of displays, including those within this range, or greater than or less than this range will be recognized from this disclosure.

The primary display 20 presents the food item identifications within icons 24. Each icon 24 represents a location of a tray within a compartment 12 of the holding bin 10. The GUI 22 visually represents each compartment with a portion 26 of the GUI comprising aligned icons 24. As will be described in further detail herein, the icons 24 are configured to visually present information regarding an associated tray 14 and the contents therein. In addition to identifying a location of the associated tray 14, the icons may present a size of the tray and may provide a held time and/or estimated product count indication. Still further, the primary display includes operational controls 28 which may be selected by a user to provide additional inputs to the holding bin, for example to change the food product identifications, the tracking daypart, and/or temperature set-points for each of the tray locations.

Looking to the holding bin 10 and the primary display 20, the icons 24 correspond to the trays 14 located in an associated compartment 12. The icons 24 may further represent the size of the tray, for example, as icons 24A correspond to ⅓ size trays 14A, while icons 24B correspond to ½ size trays 14B. It will be noted that some compartments may not use all of the available tray locations, for example if only two tray locations within a compartment are used which provides a separation between two food types (e.g. crispy chicken and filet as shown in FIG. 1). In another example, a ⅓ size tray 14A may be paired with a ½ size tray 14B. The GUI 22 presented on the primary display 20 is informative, with the information described above, and as depicted is exemplarily centrally located at the top of the holding bin, for example above all of the compartments 12. However, as the holding bin includes more tray locations, the grid of icons 24 identifying each tray and representing the tray locations becomes difficult for users to quickly identify tray 14 corresponding to each icon 24 presented in the GUI 22 on the primary display 20. For example, icon 24C may represent a ⅓ size tray with food that has exceeded a maximum holding time and therefore must be discarded and not used. Icon 24C may provide such indication with a red color or illumination. However, within the grid presented in the GUI 22 with eighteen possible tray locations, it can be challenging to a user to quickly identify the tray 14C that corresponds to icon 24C. While some holding bin solutions provide lights, visual indicators, or graphical displays in proximity to each tray location, for example in association with the shelves 13 of the holding bin. However, this increases the complexity of the system and each of these separate indicators creates a point for moisture, grease, or food particle infiltration, creating cleaning and/or operational challenges. Furthermore, while the primary display 20 is centrally located, it is also in a location elevated above all of the compartments 12 of the holding bin 10. Therefore, it presents a challenge for operation by users of smaller stature or arm length.

The present inventors address these concerns with the sidebar display 30 as described in further detail herein. The sidebar display 30 exemplarily includes a capacitive touch-sensitive graphical display 58 and extends for a length roughly commensurate with the vertical extent of the array of compartments 12 of the holding bin 10. The sidebar display 30 comprises a series of active regions 34, each active region 32 in alignment with one of the compartments 12. An active region 34 of the sidebar display 30 is thus associated with each of the compartments. Each active region 34 includes a plurality of icons 32 that represent each of the food tray locations in that compartment 12. The icons 32 provide an indication of the operation of each tray location in that compartment 12. As with the icons 24 in the primary display, the icons 32, may provide an indication of a tray contents identification, a time or inventory status of the tray contents, and/or an indication of a tray location. It will be recognized that the information presented in the active regions 34 of the sidebar display 30 will be coordinated with a corresponding portion 26 of the primary display 20 as both displays provide information regarding the location and status of trays and the operational settings for the operation of the compartment by the controller. It will be recognized that the information displayed for each tray by icons 24 and 32 may be the same and/or may be coordinated, for example providing the same/similar information such as tray location, similar colors, or food item identifications/abbreviations. The information displayed by the icons 24 and 32 may be complementary, for example, providing different information (e.g. one display provides remaining food item count, while the other display provides remaining hold time).

Looking to the sidebar display 30, icons 32A correspond to trays 14A, while icons 34B correspond to trays 14B. Inactive icons 32D indicate unused tray locations within the associated compartment 12. Icon 32C corresponds to tray 14C and provides a similar indication that the tray includes food that has exceeded a maximum holding time and therefore must be discarded and not used, for example by illuminating with a red illumination. The location of the icon 32C provides guidance to a user to quickly and accurately find the tray 12C.

The sidebar display 30 further provides the communicative function of a user input device. As previously noted, the sidebar display incorporates touch-sensitive user input capabilities. The sidebar display 30 may include capacitive touch sensors in association with each of the active regions 34. In a further example, a capacitive touch sensor is positioned in association with each icon 32 in each of the active regions. The sidebar display 30 is not limited to capacitive touch sensors and may include other forms of touch-sensitive input technology, including but not limited to resistive touch sensors. In addition, the touch-sensitive input technology may be incorporated into the display, for example a with an AMOLED display or other technologies. The user input capabilities of the sidebar display 30 brings the user input controls closer to the compartment 12 in which the input pertains. For example, when a tray of food products have been replaced with a tray of freshly prepared food products, the user can select the active region 34 or icon 32 associated with the tray location to reset the expiration timer, product count, or any notifications associated with the tray/tray location.

Location of a user input option enables workers to interact with the holding bin 10, to provide necessary inputs or control instructions, without having to reach to the top of the holding bin 10 above all of the compartments 12. The notifications of the visual display of the sidebar display 30 presents the icons in association with each compartment 12, while also providing the input device location in association with each compartment 12. The location and/or connection of the sidebar display 30 to the holding bin 10 as described herein, further enables the use of such technologies in combination with space and obstruction to thermal, moisture, and grease infiltration to the components of the visual display and touch-sensitive input technologies.

Additionally, the sidebar display 30 is exemplarily configured as a removable component from the holding bin 10. The sidebar display 30 is constructed as a separate component of the holding bin 10. In an example the sidebar display 30 is configured to be secured to an exterior of the holding bin 10. As described above, the holding bin 10 is exemplarily constructed with an exterior housing 16 of stainless steel sheet metal. This housing 16 protects the electronics in the interior of the housing, and also provides a cleanable surface. By providing the sidebar display 30 as a separate component securable to the exterior of the housing 16, the integrity of the housing is preserved, while providing additional display functionality. Additionally, with the sidebar display 30 as a separate component, the sidebar display 30 may be added separately to a unit, for example as a upgrade to a holding bin already in the field. In further examples as provided herein, the sidebar display 30 may be removable for cleaning of the holding bin 10 and/or for replacement or service of the sidebar display 30.

In one example, the sidebar display 30, is secured to the housing 16 by a magnetic interaction between magnetic components of the sidebar display 30 and magnetic components or structure of the holding bin 10, including but not limited to the housing 16 itself. As the sidebar display 30 is brought into a near-field RF communication range, the sidebar display 30 can be paired with the controller (not depicted) of the holding bin 10 within the housing 16 for wireless communicative connection. The controller operates the sidebar display 30 to present indications of food tray locations and states within the holding bin in conjunction and coordination with the presentation on the primary display 20. In another example, as described in further detail herein, the sidebar display 30 is incorporated into a panel that secures to the housing 16. The sidebar display 30 may be connected to the controller through wired connections internal to the panel.

Figure 2:
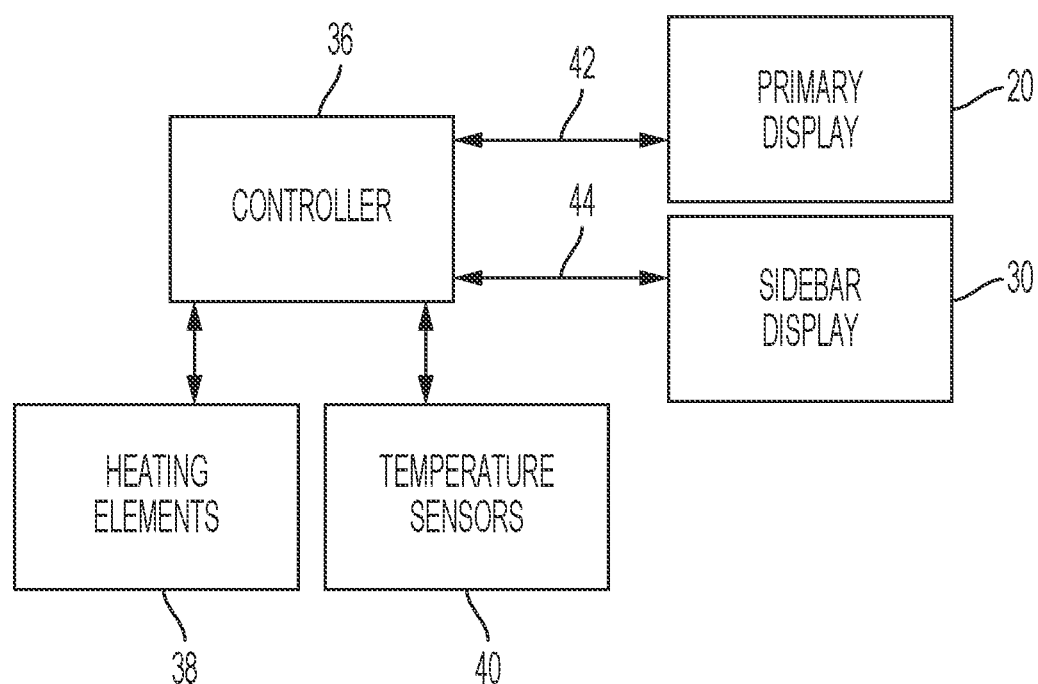
FIG. 2 is a schematic diagram of an interface system for a holding bin.

FIG. 2 is a schematic diagram of the controller and displays of the holding bin 10. The controller 36 is exemplarily a single board controller such as provided by Vantron. The controller 36 provides a microprocessor and communication interfaces for the rest of the system. The controller communicates to the primary display 20 and the sidebar display 30 through a serial peripheral interface (SPI) which is a synchronous serial communication interface specification used for short-distance communication. The controller 36 is further connected to the heating elements 38 and the temperature sensors 40 of the holding bin 10 to carry out the operational functions of the holding bin as described in the previously discussed and incorporated references. As discussed in further detail herein, while many of these communicative connections between the controller 36 and these components are wired connections, at least some of these connections may be made wirelessly, using any of a variety of short-range communication protocols, including, but not limited to Bluetooth or ZigBee.

Figure 3:
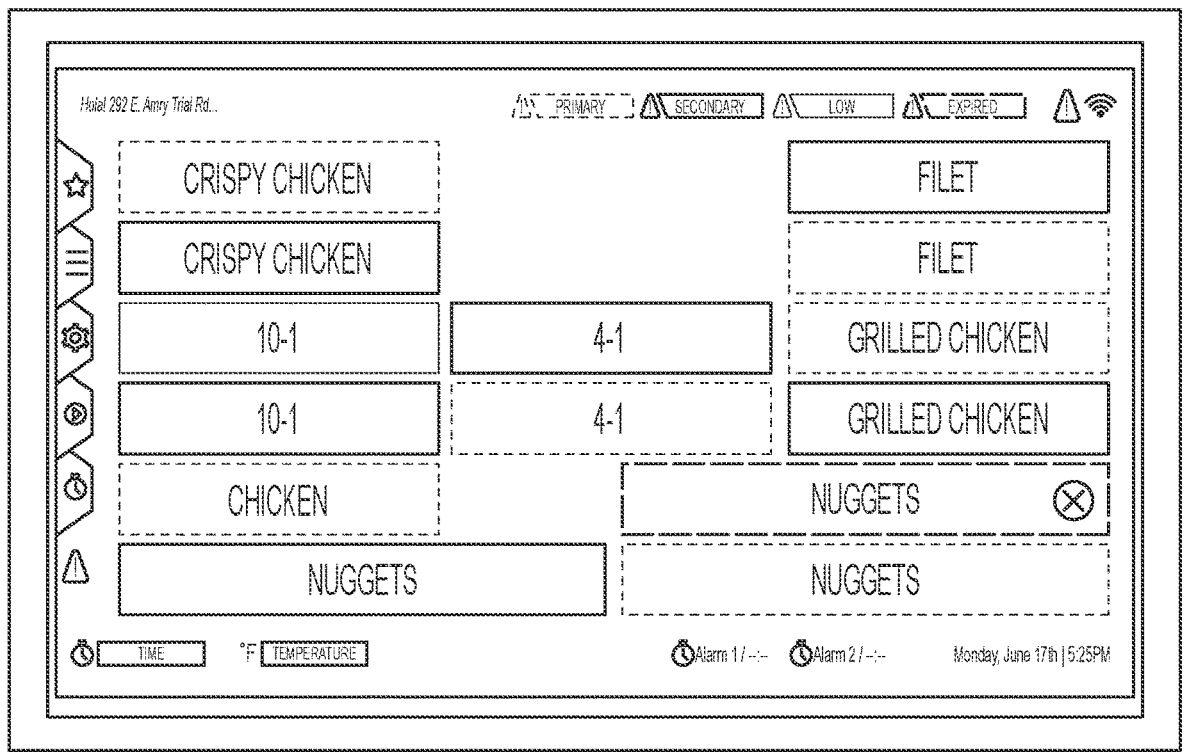
FIG. 3 depicts an example of a graphical user interface of a primary display for a holding bin.

A communicative connection 42 connects the controller 36 to the primary display 20. A communicative connection 44 connects the controller 36 to the sidebar display 30. While the communicative connection 42 is primarily a wired connection, in examples, the communicative connection 44 is a wireless connection. The controller 36 includes an antenna (not depicted) that transmits and receives short-range RF wireless signals between the controller 36 and the sidebar display 30. FIG. 3 is an exploded view of an example of the sidebar display 30. The communication is exemplarily performed using Bluetooth or ZigBee communication protocols.

FIG. 3 presents an example of the primary display 20. It will be recognized that in examples, the primary display 20 and the sidebar display 30 are operated in a coordinated manner so as to present consistent information. In one example, the color indications used by the primary display 20 and the sidebar display 30 are the same, indicating the same food tray states. Inactive compartment locations are indicated by dark or inactive icons. Primary food tray of a product is indicated by green illumination while secondary trays of a product are indicated by white illumination. Low product count, indicating that more food product should be cooked or prepared is indicated with yellow and expired (e.g. timed out) food product is indicated with red.

As seen with respect to FIG. 1, with use of the primary display 20 and the sidebar display 30, the user is presented with two different grids of product location identification as well as two different locations with which the user can interact with the holding bin. This provides a more flexible arrangement of interaction and use. In an example, the sidebar display 30 is removably secured to the housing 16 defining the exterior of the holding bin 10.

Figure 4:
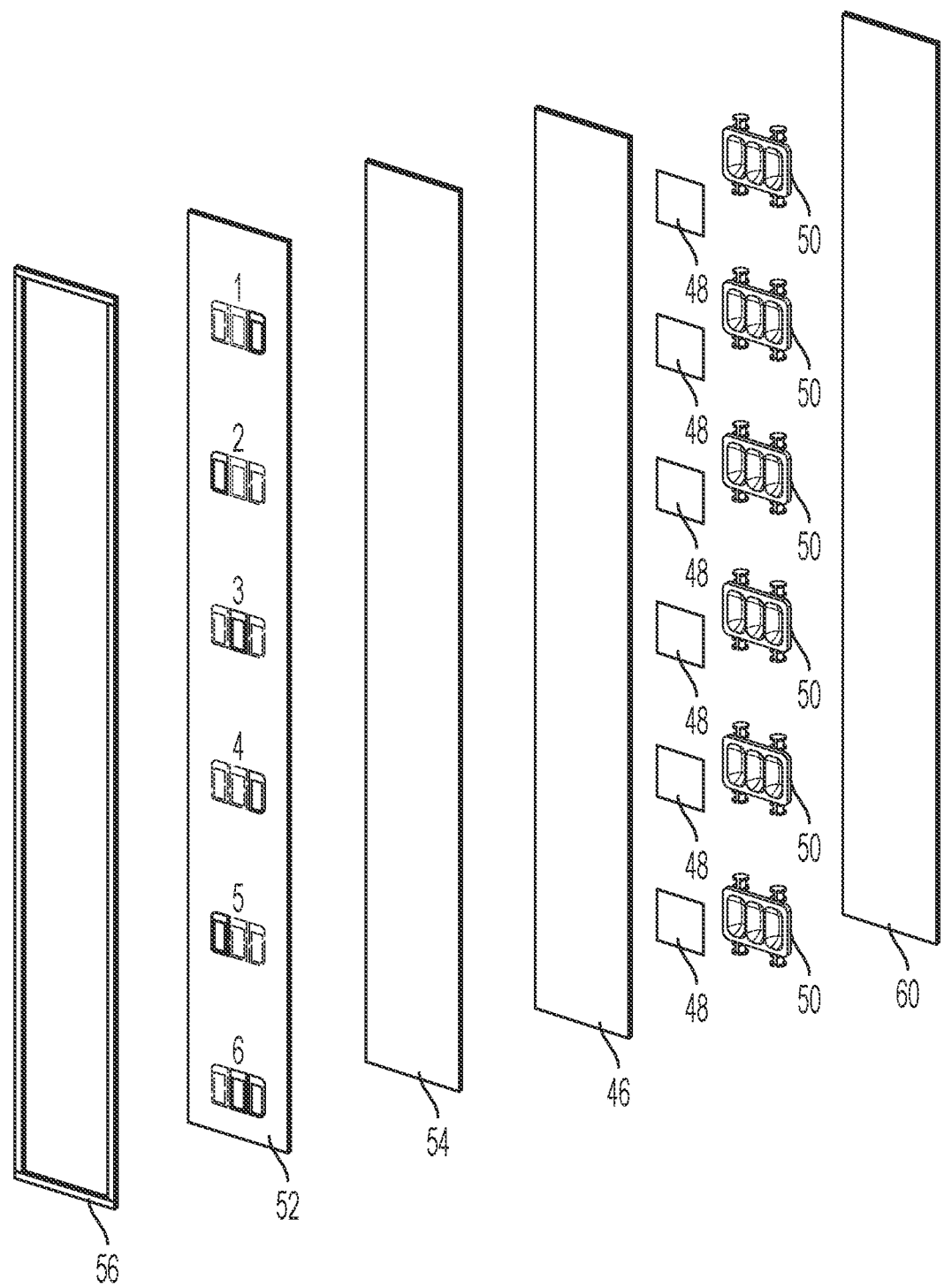
FIG. 4 is a front exploded view of a sidebar display.

As shown in FIG. 4, the sidebar display 30 is a sandwich of layers forming a thin, touch-capacitive display that can be affixed to the housing of the holding bin. It will be recognized that FIG. 4 is for illustration purposes and that other orders of the components shown may be made within the scope of the present disclosure. The sidebar display 30 includes its own circuit board 46 that includes a microcontroller, wireless antenna, and the electronics as described herein to carry out the receipt of capacitive touch-inputs and LED illumination display outputs. It will be recognized that other types of visual outputs or input receipts may be used within the scope of this present disclosure.

As noted, the sidebar display 30 includes light-emitting diodes LEDs 48, which are exemplarily multi-color LEDs. In an example, the primary display 20 and the sidebar display 30 use the same color scheme to indicate active/inactive, primary trays, secondary trays, more product needed, and product expired, indications for each of the tray locations within the holding bin. Therefore, in an example, the LEDs used may be an array of single-color LEDs or a multi-color LED capable of providing the example, off, white, green, yellow, and red illuminative states. Such LEDs 48 are provided and individually controlled and operated for each icon 32 of each active region 34 of the sidebar display. The LEDs 48 may be mounted to the circuit board 46 in any suitable known technique.

The sidebar display 30 may further include reflectors 50 associated with each of the LEDs for each of the icons 32, the reflectors 50 may be constructed of plastic or metal or other suitable material. The reflectors are positioned relative to the LEDs 48 such as to redirect light energy out of the sidebar display 30, to diffuse the redirected light to make the display visually appealing, and to optically isolate the LEDs associated with each of the icons 32 to limit bleed between the present illuminations of the icons.

As previously noted, the circuit board 46 includes capacitive touch-sensitive electronics. A plate 52 of suitable glass, including but not limited to chemically enhanced glass and synthetic sapphire glass, or suitable polymer materials, is secured over the circuit board 46. This is exemplarily carried out with a layer of adhesive 54. The plate 52 is masked, for example with a silk-screened ink to form the outlines of the icons 32 of the active regions 34 with the unmasked portions of the plate 52. Alignment of these unmasked portions with the associated LEDs 48 as described above directs the illumination from the LEDs out of the unmasked portions. The capacitive sensitive electronics are similarly positioned relative to each of the unmasked portions so that user touch interactions at each of the icons 32 are sensed as the touch-inputs.

While the example above is presented with one version of the sidebar display, it will be recognized that other versions, including implementations using other forms of visual displays may be used, for example, sidebar displays implemented using AMOLED or other known graphical display technology are within the scope of the present disclosure.

As presented, the sidebar display 30 provides a further display that can be selectively added to a holding bin. The sidebar display 30 exemplarily provides this capability in an electrically efficient manner such that the sidebar display 30 can also be powered by wireless energy transmission from the controller 36 or from a power transmission circuit located elsewhere in the holding bin 10. In still further examples, the sidebar display 30 may be powered by a battery or other power source packaged with the sidebar display, while in still further examples, the sidebar display may be powered by conductive or inductive power transmission with a suitable electrically connected component located within the holding bin 10.

In an example, an adhesive film 56 overlays the previous layers of the sidebar display 30 and secure the combined layers to the housing of the holding bin. In a further example, the adhesive film may be instead used as to secure the components of the sidebar display to one another. The sidebar display 30 may be secured to the housing 16 of the holding bin 10 by a backing 60 which may be adhesive or magnetic. A magnetic backing 60 may be configured to attracts to the material of the housing 16 (e.g. suitable compositions of stainless steel) or the magnetic backing attracts to mounting regions of a suitable magnetic material positioned within the holding bin 10.

Figure 5:
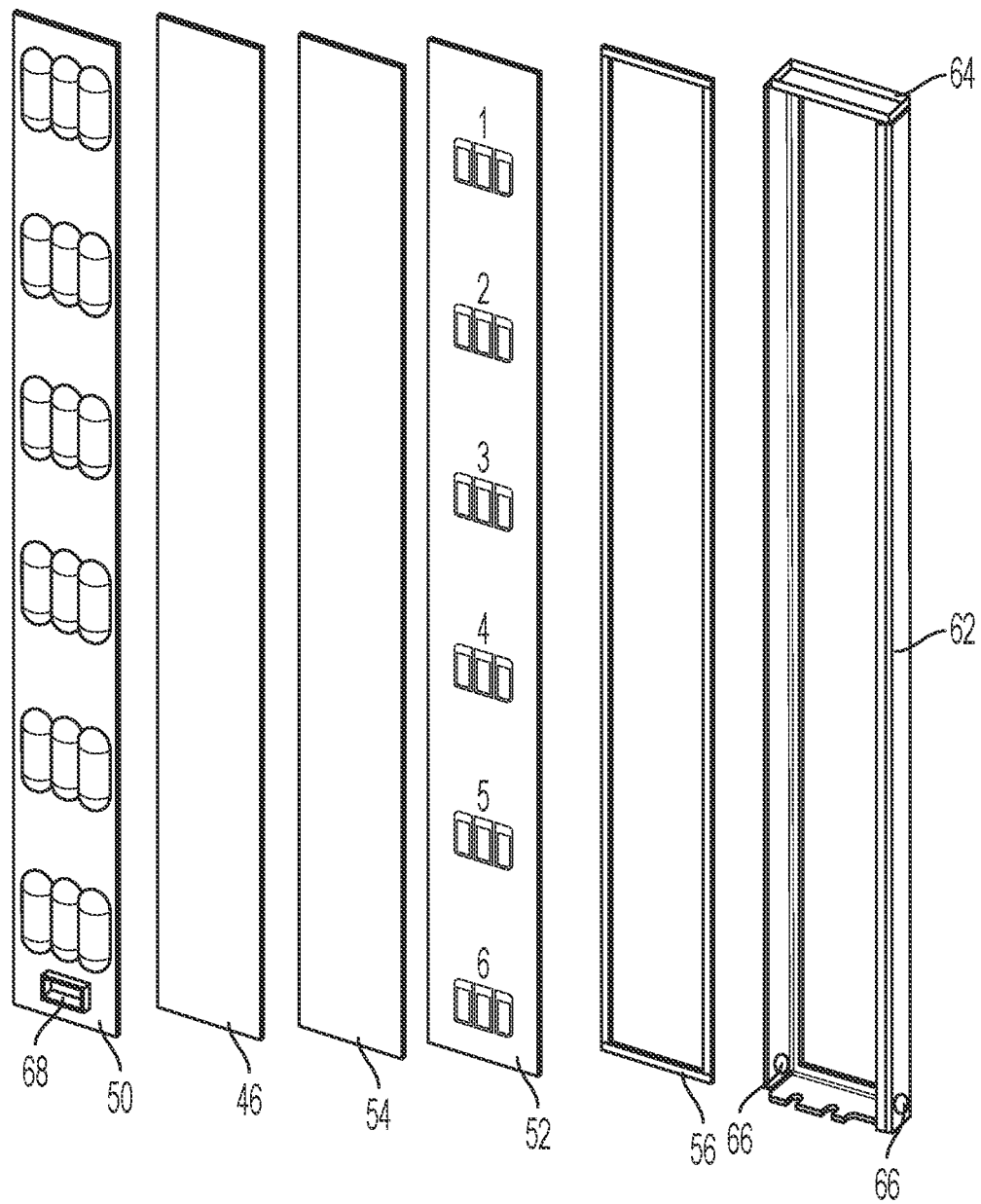
FIG. 5 is a back exploded view of a sidebar display.

FIG. 5 also depicts an example of a sidebar display 30. FIG. 5 is a rear exploded view of the example of the sidebar display 30. The sidebar display 30 includes many of the same components as the sidebar display shown and described above with respect to FIG. 4. It will be recognized that for the sake of brevity that like reference numerals between the figures are used to identify like components between the examples. It will be recognized that the LCD's from FIG. 4 may be incorporated into the example of FIG. 5. In another example, the plate 52 of glass providing the panel incorporates a graphical display, for example an AMOLED with touch-sensitive capabilities. The components are arranged and fit into the sidebar housing 62. The sidebar housing 62 is configured to secure the sidebar display 30 to the housing 16. The sidebar housing 62 is exemplarily constructed of stainless steel, or another material configured to match the housing 16 of the holding bin 10. The sidebar housing 62 includes, as will be described in further detail herein, an alignment projection 64, exemplarily at the top of the sidebar housing 62 and through holes 66, exemplarily at the bottom of the sidebar housing 62. As will be described in further detail herein, the sidebar display 30 further includes an electrical port 68. It will be recognized that the electrical port 68 may be located at any location along the sidebar display 30, as may be suited for construction of the holding bin 10 and the sidebar display 30. The electrical port exemplarily provides access to an electrical connector through which wires can physically connect to the electronics of the sidebar display.

Figure 6:
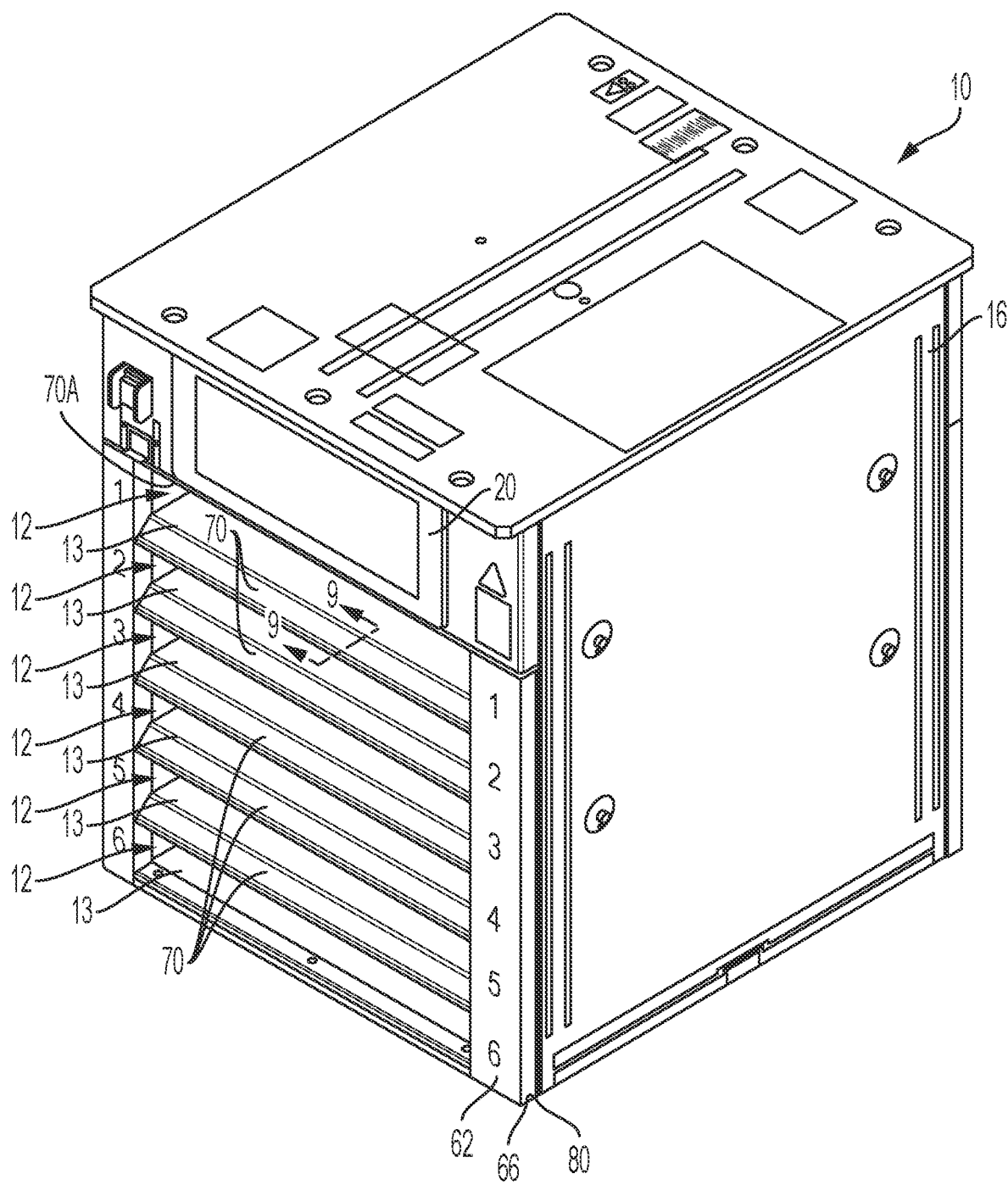
FIG. 6 is a perspective view of a holding bin.

FIG. 6 is a perspective view of a holding bin 10. The holding bin 10 includes a primary display 20 which operates in the manner as previously described. The holding bin 10 further includes end caps 70 which are secured to the front of each of the shelves 13. A detailed sectional view of an end cap 70 is provided at FIG. 9. The shelf 13 is recessed internal to a front plane of the holding bin 10, for example as defined by the housing 16. The end caps 70 are each fitted to a front side of the shelf 13, and extend outward to approximately the front plane of the holding bin 10. Prior holding bin solutions often use a bezel secured in front of the shelf and which extended proud of the front plane of the holding bin, for example as defined by the housing 16. In some examples, such bezels secure to the housing 16 and extend outward therefrom. Instead, the end caps 70 as disclosed herein may be contained within the footprint of the housing 16.

The end caps 70, further include an angled or wedged leading surface 72. The leading surface 72 extends upwardly to the bottom panel of a compartment 12 as provided by the shelf 13. One exception is exemplarily found with the uppermost compartment, where a second end cap 70A is provided above the compartment and angles downwardly to the top panel of the uppermost compartment. This end cap 70A is exemplarily identical in construction to the other end caps 70, but is secured to the holding bin to angle in a downward manner towards the top panel of the compartment 12. In use, the end caps 70 and end cap 70A seek to further direct a leading edge of a tray 14 into the compartment. In examples, to improve operational efficiency and to help to maintain the controlled holding environment created in the tray by the operation of the holding bin, the vertical height of the compartment 12 between the bottom panel and the top panel is dimensioned to provide limited clearance beyond the vertical height of an associated tray. In an example, such limited clearance may be 0.25 inch, between 0-0.25 inch, or between 0-0.5 inch. This leaves little room for error for a user to lift the tray and accurately hit the opening of the compartment 12 with the tray, particularly if the try is full of food and therefore at its heaviest and/or the user is trying to work quickly to assemble a customer's order. Therefore, the end caps provide a margin of error by directing the tray into the compartment if the tray strikes the end cap. The inventors have found that users more typically are "low" in their misses and therefore an upwardly angled end cap improves user success in replacing the tray within the compartment, while reducing potential damage to the trays and to the holding bin.

Figure 9:
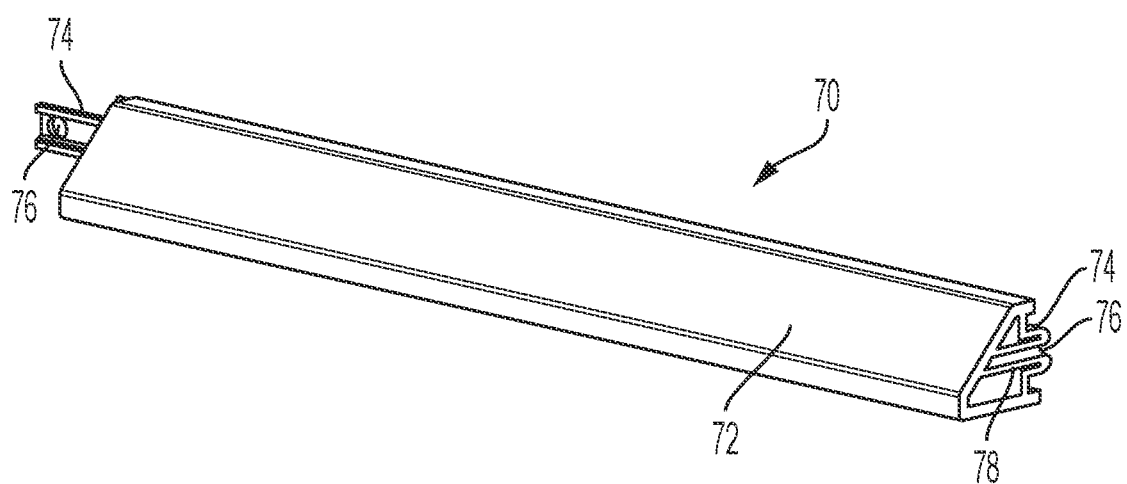
FIG. 9 depicts an example of an end cap.

Referring to FIG. 9, the end cap 70 may be formed as an injection molded or extruded body of polymer material. The end cap 70 exemplarily includes a separate mounting bar 74 that extends beyond the length of the end cap 70. The mounting bar 74 is used to secure the end cap 70 to the housing 16, for example, with fasteners (not depicted) through holes 76. The end cap 70 further includes mounting conduits 78, exemplarily formed unitarily with the rest of the end cap 70. The mounting conduits 78 align with further holes 76 through the mounting bar 74. Fasteners (not depicted) secure the mounting bar 74 to the mounting conduits 78 of the end cap 70.

Figure 7:
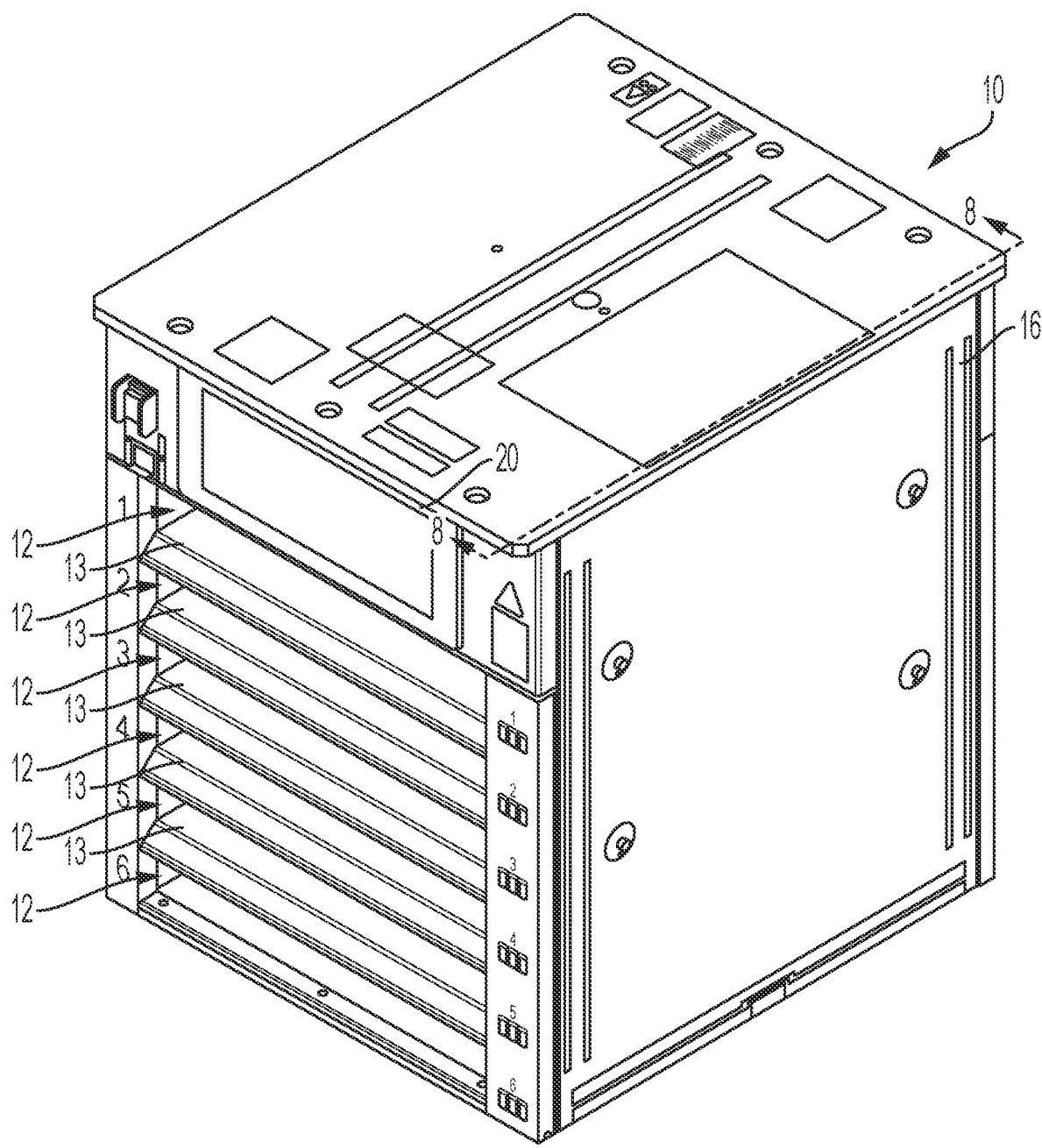
FIG. 7 is a perspective view of a holding bin with a sidebar display.
Figure 8A:
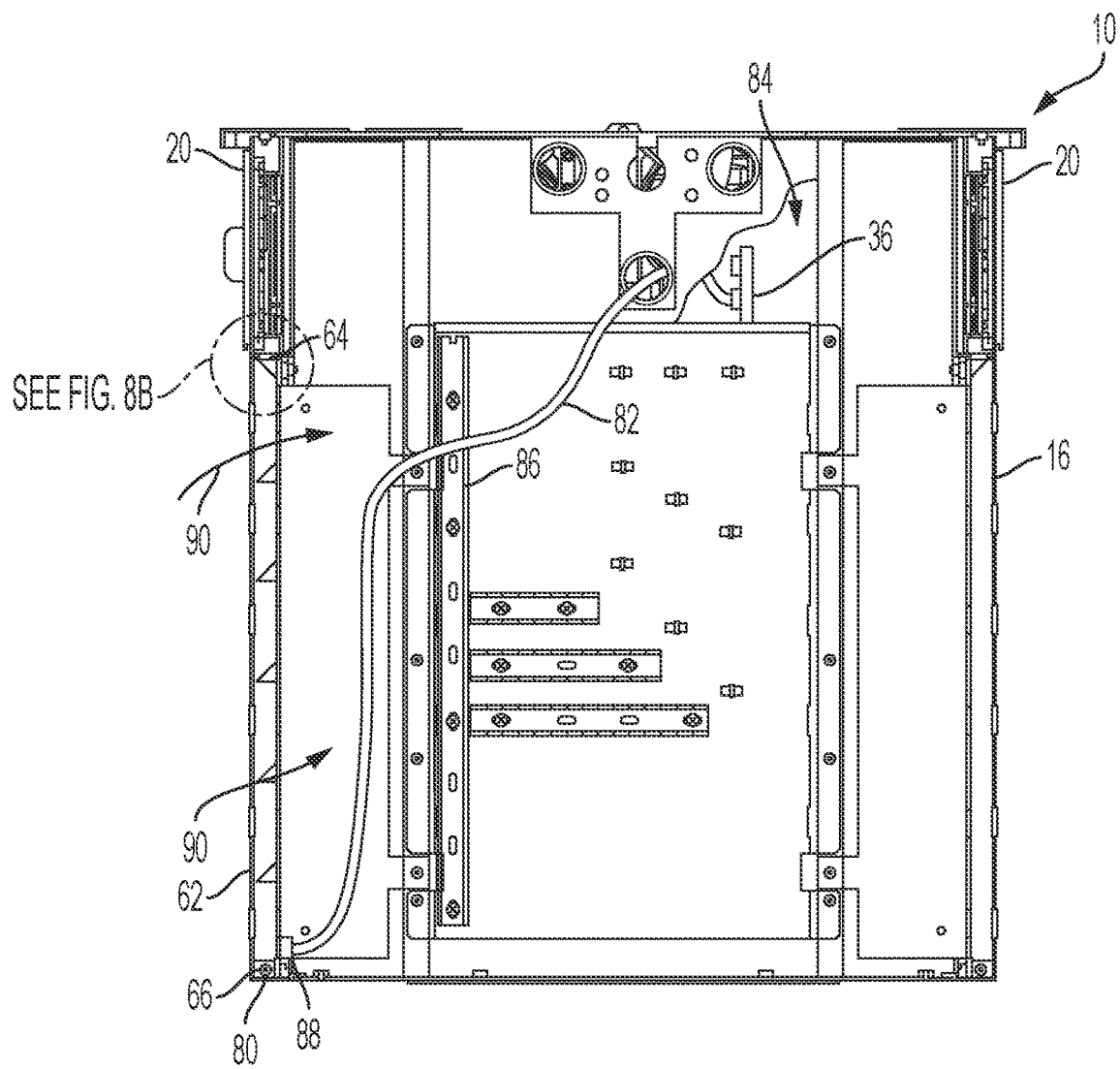
FIG. 8A is a sectional view taken along line 8-8 of FIG. 7.
Figure 8B:
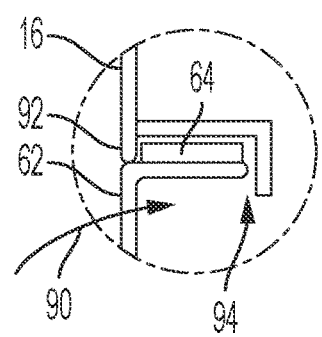
FIG. 8B is an enlarged detailed view of a portion of FIG. 8A.

Referring back to FIG. 6, a sidebar housing 62 that does not include a sidebar display 30 is depicted. With reference to FIGS. 6-8, an example is provided of a the installation and addition a sidebar display 30 to the holding bin 10. As described previously, the sidebar housing 62 exemplarily includes holes 66 through which a fastener 80, exemplarily a screw, extends to secure the sidebar housing 62 to the housing 16 and the holding bin 10. In FIG. 7, the holding bin 10 is presented with a sidebar housing 62 that includes the sidebar display, for example as described above with respect to FIG. 5. FIG. 8 is a sectional view of the holding bin 10 taken along line 8-8 of FIG. 7. With a portion of the housing 16 removed, wires 82 extending from the controller 36 to make a physical connection at connector 88 with the electronics of the sidebar display 30 are depicted. The controller 36 is exemplarily located within an attic compartment 84 of the holding bin 10, the attic compartment 84 having temperature and humidity isolation/barriers, or mitigation to protect the electronics, for example the controller 36 from the temperature, moisture, grease, and food debris associated with operation and use of the holding bin 10.

The wires 82 are held in place by one or more wire harnesses 86 such that the wire 82 can be securely stored and made available within a sidebar cavity 96 of the holding bin 10 which is at least partially defined by the sidebar housing 62. The sidebar housing is movable as described herein for access to the sidebar cavity and/or for service or replacement of the sidebar housing 62 and or the sidebar display 30. As previously noted, the sidebar housing 62 (with or without the sidebar display 30) is secured to the housing 16 with the fastener 80 extending through holes 66. With the sidebar housing 62 secured in this manner, the sidebar housing is rotatable in the direction of arrow 90 to rotate into position. As best shown in the inset portion of FIG. 8, which provides a detailed magnified view of a portion of the sidebar housing 62, as the sidebar housing 62 rotates in the direction of arrow 90, the alignment projection 64 comes into an interference fit with a lip 92 of the housing 16. Deformation between the structures enables the alignment projection 64 to move past the lip, to secure the entire alignment projection 64 within a pocket 94, releasably securing the sidebar housing 62 to the housing 16. It will be recognized that in examples, this connection arrangement further helps to prevent grease and/or moisture infiltration into the sidebar cavity and the electronics therein since the sidebar housing 62 may be constructed of a single piece of metal and the lip 92 may overhang a top portion of the sidebar housing in addition to overhanging the alignment projection 64.

Additionally, as seen in FIG. 8, in an example, a second primary display 20 is provided at the back of the holding bin 10. In such an example, the compartments 12 may extend all the way through the holding bin 10 such that the trays 14 within the compartments 12 are accessible from both sides. This arrangement may facilitate a workflow in which the trays 14 are filled and loaded into the compartments 12 from one side and removed and replaced by users during the assembly of food orders. It will be recognized that in examples, the holding bin may also include a second sidebar display 30 on the back side of the holding bin 10 as well. Such sidebar display 30 may operate in the same manner as previously described.

Figure 10:
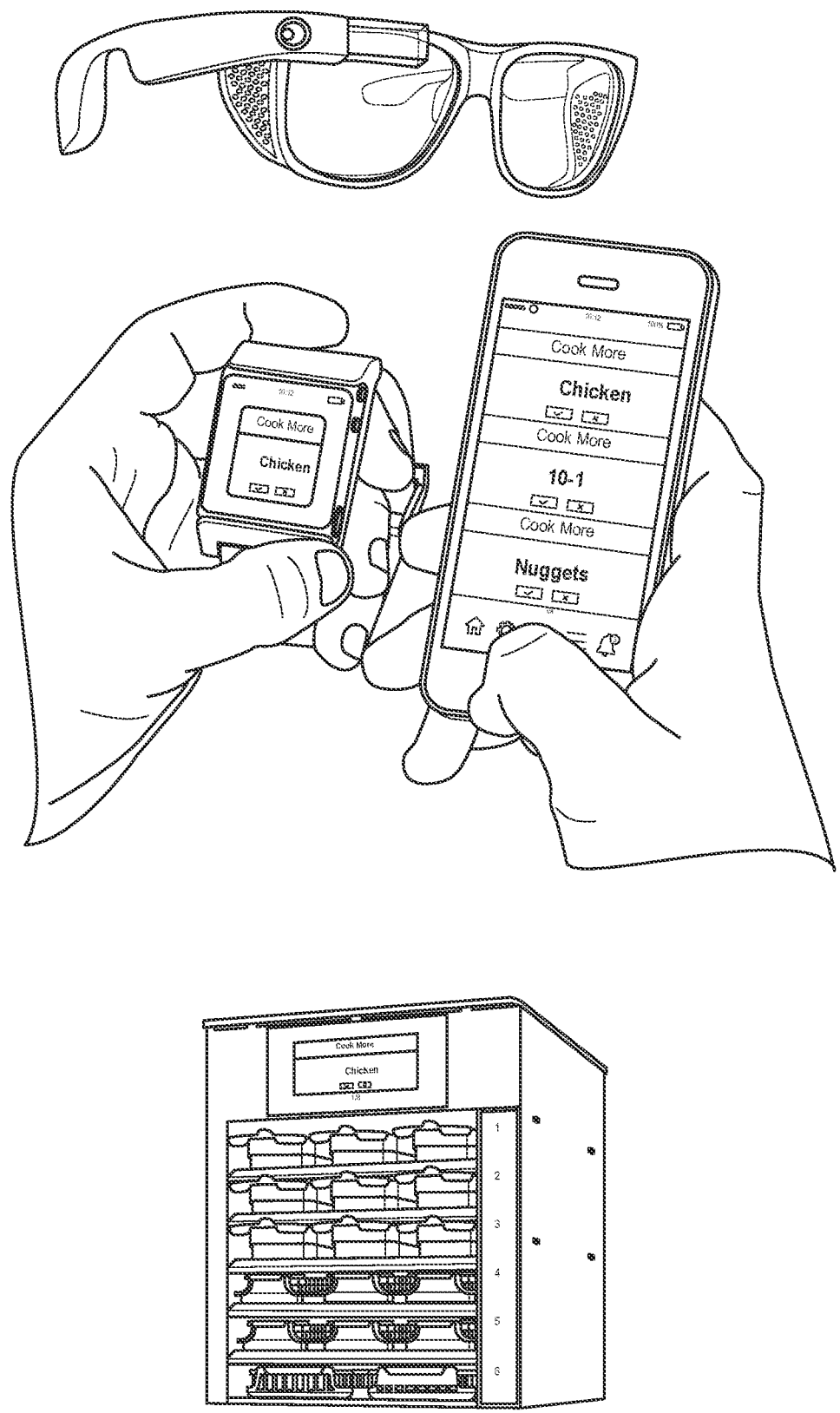
FIG. 10 diagrammatically depicts interaction of peripheral mobile devices with a holding bin.

FIG. 10 depicts still further connectivity of the holding bin 10 with peripheral mobile devices, which may include, but are not limited to augmented reality (AR) glasses, a smartphone, or a smart watch. While not depicted in FIG. 6, the peripheral mobile devices may further include a tablet computer or a laptop computer. Examples of AR or other mobile devices and associated display systems are described in further detail in Applicant's co-pending US Patent Application Publication No. 2019/0066239, entitled, "System and Method of Kitchen Communication," which is incorporated by reference herein in its entirety. The peripheral mobile devices may be connected to the controller 36 as depicted and described above in FIG. 2 with respect to the sidebar display 30. Through these communicative connections, notifications presented on the primary display and/or the sidebar display may be further pushed out to the peripheral mobile devices, which may be associated with various managers or employees. With the system described herein a coordinated presentation across these visual displays is achieved to keep personnel appraised of the current status of the food held in the holding bin.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A holding bin comprising:
   a plurality of compartments defined across a width of the holding bin, each compartment of the plurality of compartments configured to receive a plurality of food holding trays; a housing defining an outer perimeter of the holding bin;

a first display secured through the housing;

a second display secured to a sidebar housing removably secured the housing; and a controller communicatively connected to the first display and the second display, wherein the controller is configured to operate the first display and the second display to coordinately present a location and a status of the food holding tray within the compartment of the plurality of compartments.

2. The holding bin of claim 1, wherein the first display is mounted to the housing at a position above the plurality of compartments.

3. The holding bin of claim 2, wherein the second display is mounted adjacent to the plurality of compartments.

4. The holding bin of claim 3, wherein the second display comprises a plurality of active regions, each active region of the plurality of active regions adjacent to and associated with one compartment of the plurality of compartments.

5. The holding bin of claim 4, wherein each active region comprises a plurality of icons, and each icon of the plurality is associated to the food holding tray location within the associated compartment.

6. The holding bin of claim 4, wherein the active regions are configured to receive user inputs and communicate received user inputs to the controller.

7. The holding bin of claim 6, wherein the controller operates to coordinately receive user inputs to the controller from both the first display and the second display.

8. The holding bin of claim 1, further comprising a shelf located between two vertically adjacent compartments of the plurality of compartments, wherein the shelf comprises a bottom panel of an upper compartment of the plurality of compartments and the shelf comprises a top panel of a lower compartment of the plurality of compartments.

9. The holding bin of claim 8, further comprising an end cap secured to a face of the shelf, the end cap comprising a leading surface.

10. The holding bin of claim 9, wherein the leading surface angles upwards to the bottom panel.

11. The holding bin of claim 10, wherein the shelf is inset within the housing and the end cap secured to the face of the shelf is inset within the housing.

12. The holding bin of claim 10, further comprising a top end cap, wherein the shelf is an uppermost shelf and the upper compartment is the uppermost compartment of the plurality of compartments, and the top end cap is secured to the housing across the compartment and a leading surface of the top end cap angles downwardly to a top panel of the uppermost compartment of the plurality of compartments.

13. The holding bin of claim 10, wherein the compartments of the plurality of compartments are vertically dimensioned to be within 0.25 inch of a vertical height dimension of the food holding tray.

14. The holding bin of claim 1, wherein the sidebar housing is pivotably secured to the housing.

15. The holding bin of claim 1, wherein the sidebar housing further comprises an alignment projection that secures the sidebar housing to the housing with an interference fit.

16. The holding bin of claim 1, wherein the sidebar housing defines a sidebar cavity in which an electrical connection between the controller and the second display is made.

17. The holding bin of claim 1, wherein the first display and the second display each present the location and the status of the food holding tray within a compartment of the plurality of compartments.

18. The holding bin of claim 1, wherein the controller is physically communicatively connected to the first display and the controller is wirelessly communicatively connected to the second display.

19. The holding bin of claim 18, wherein the second display comprises a magnet and the second display is removably secured to the housing by the magnet.

* * * * *